US010976977B2

(12) United States Patent
Bindana et al.

(10) Patent No.: US 10,976,977 B2
(45) Date of Patent: Apr. 13, 2021

(54) APPARATUS AND METHOD FOR MANAGING THE PRINTING OF AN ELECTRONIC DOCUMENT HAVING MULTIPLE PAGE SIZES

(71) Applicant: Xerox Corporation, Norwalk, CT (US)

(72) Inventors: Srinivasarao Bindana, East Godavari District (IN); Rathinavell Arumugam, Tirunelveli District (IN); Anand Arokia Raj Antony Muthu Rayar, Chennai District (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/896,462

(22) Filed: Jun. 9, 2020

(65) Prior Publication Data

US 2021/0011676 A1    Jan. 14, 2021

Related U.S. Application Data

(63) Continuation of application No. 16/506,077, filed on Jul. 9, 2019, now Pat. No. 10,712,987.

(51) Int. Cl.
*G06F 3/12* (2006.01)
*H04N 1/00* (2006.01)

(52) U.S. Cl.
CPC ....... *G06F 3/1296* (2013.01); *H04N 1/00411* (2013.01)

(58) Field of Classification Search
None
See application file for complete search history.

(56) References Cited

U.S. PATENT DOCUMENTS

| 4,814,893 A | 3/1989 | Katoh |
| 6,332,170 B1 | 12/2001 | Ban |
| 8,456,692 B2 | 6/2013 | Yamanouchi |
| 2013/0088734 A1 | 4/2013 | Kim |

*Primary Examiner* — Thomas D Lee
(74) *Attorney, Agent, or Firm* — Jones Robb, PLLC

(57) ABSTRACT

Systems, methods, and devices are configured to manage the printing of an electronic document having different page sizes. They include receiving a request from a user to print an electronic document, the electronic document arranged as a set of pages. They also include determining if a page size for a page of the set of pages in the electronic document matches at least one print media size available for printing. They further include providing a message for display to the user, the message including an indication that the page size for the page is not available for printing when it is determined that the page size of the page does not match the at least one print media size. The message also including a menu with a set of user selectable options for completing the print request on the printing device.

20 Claims, 8 Drawing Sheets

APPARATUS AND METHOD FOR MANAGING THE PRINTING OF AN ELECTRONIC DOCUMENT HAVING MULTIPLE PAGE SIZES

CROSS-REFERENCE TO RELATED APPLICATION(S)

This patent application is a continuation of U.S. patent application Ser. No. 16/506,077, filed on Jul. 9, 2019, which is incorporated by reference herein in its entirety.

TECHNICAL BACKGROUND

Printer systems, such as printers, printer/scanners, and multi-function devices (MFDs), allow users to create and submit a processing job, such as a print job, a copy job, or scan job, from a physical or electronic document and produce an output as a physical printed or electronic ready-to-print document These printer systems are often networked as part of a home or office network configured to allow a user access to any one of the devices. Networked printers also allow the user to access or create an electronic document from a job created as a print job, copy job, or scan job on one MFD or printer device and print the electronic document on any other printer or MFD on the network. Printer systems are an important part of a productive home or office environment.

However, a user may initiate a request to print an electronic document on an MFD or printer device that includes pages requiring several different sizes of physical print media, such as paper, cardstock, and the like. The user may initiate the request as part of a print job or a copy job or may initiate the request after inserting a memory storage device, such as a USB memory device, in a communication port on the MFD or printer device. If the MFD or printer device does not have one or more of the proper page sizes of the print media available in its media supply trays, the printer may not print the document or may automatically print the pages of the electronic document using a different page size of print media. Further, the MFD or printer device may not provide any notification to the user regarding the availability of the correct or proper page sizes of physical media for printing and further may not provide additional printing options based on the availability, such as printing only the pages for which the proper page sizes or physical media are available. As a result, material resources, such as printing ink or toner and physical media, and electrical energy may be used unnecessarily and/or wasted. Further, the user may have to invest additional time resources and energy to complete the task of printing the entire electronic document with the correct page sizes by printing multiple copies of the electronic document on different MFDs or printer devices. Therefore, there is a need to address these and other issues associated with managing the printing of an electronic document requiring multiple page sizes based on the availability of page sizes of print media in an MFD or printer device.

Overview

Exemplary embodiments described herein include methods, systems, and apparatuses for managing the printing of an electronic document having multiple page sizes. An exemplary printing or multi-function device includes a printing engine that prints data using at least one size of print media. The multi-function device further includes a print processor that receives a request to print an electronic document using the print engine, the electronic document including data arranged as a set of printable pages, the request to print based on a job created by a user. The print processor also determines if a page size for a printable page of the set of printable pages in the electronic document matches the at least one size of print media. The multi-function apparatus additionally includes a user interface that receives instructions from the print processor to display a message to the user when it is determined that the page size of the printable page does not match the at least one size of print media, the message including a notification that the printable page cannot be printed. The message also including a menu prompting an input from the user based on a set of options for completing the print request for the electronic document.

An exemplary method includes receiving a request to print an electronic document on a printing device, the electronic document arranged as a set of printable pages, the request to print being based on a job created by a user. The method also includes determining if a page size for a printable page of the set of printable pages in the electronic document matches at least one print media size available for printing on the printing device. The method further includes providing a message for display to the user, the message including a notification to the user that the printable page cannot be printed on the printing device when it is determined that the printable page does not match the at least one print media size available for printing on the printing device. The message also including a menu prompting an input from the user to continue printing electronic document based on a set of options for completing print request for the electronic document on the printing device.

An exemplary apparatus includes a memory for storing a printable document, the printable document arranged as a set of pages. The apparatus further including a processor configured to receive a request from a user to print the printable document and determine if a page size for a page in the set of pages matches at least one size of print media available for printing using a printing device. The processor is further configured to provide a notification to the user that the printable page cannot be printed on the printing device when the page size for the page does not match the at least one size of print media size available for printing using the printing device, the notification also indicating a set of options to continue to print at least a portion of the printable document using the printing device.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

Figure 1:
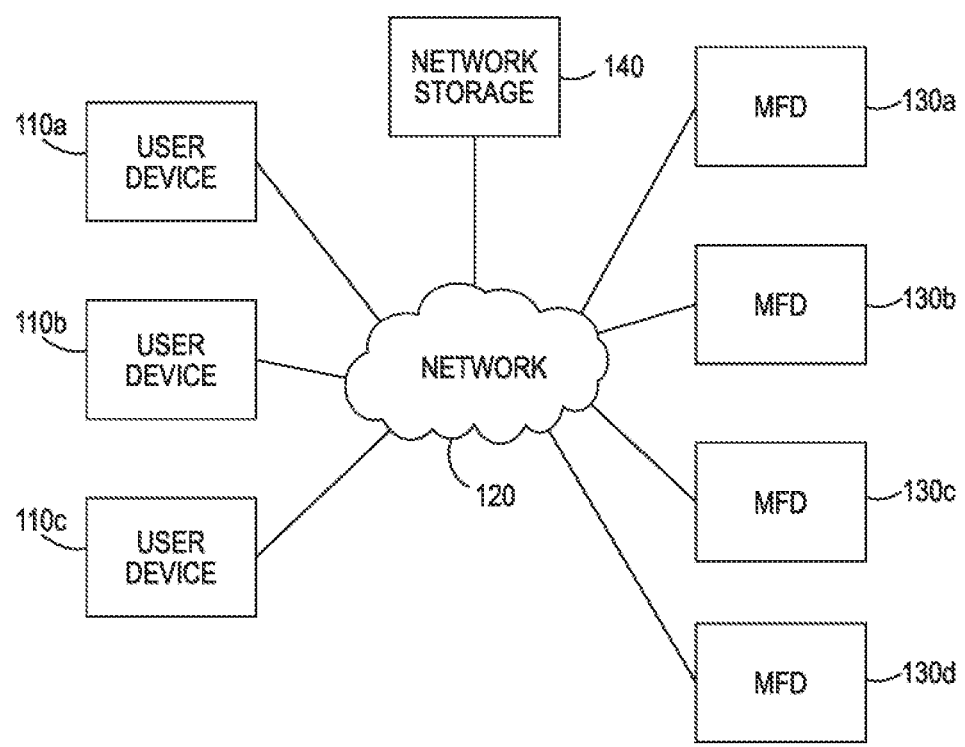
FIG. 1 depicts an exemplary system including aspects for managing the printing of an electronic document having multiple page sizes.

It should be understood that the drawing(s) are for purposes of illustrating the concepts of the disclosure and are not necessarily the only possible configuration for illustrating the disclosure.

DETAILED DESCRIPTION

In some embodiments described herein, a printer device or MFD may be included to perform one or more aspects of the disclosure. The MFD includes a printing engine that prints data using at least one size of print media. The MFD also includes a print processor that receives a request to print an electronic document using the print engine. The request to print is based on a job created by a user, the job being one of a print job request or a copy job request. The electronic document includes data or information arranged as a set of printable pages. The print processor further determines if a page size for a printable page of the set of printable pages in the electronic document matches the at least one size of print media. The MFD further includes a user interface that displays a message created by the print processor to the user when it is determined that the page size for the printable page does not match the at least one print media size. The message includes a notification to the user that the printable page cannot be printed. The message also includes a message prompting an input from the user based on a set of options for completing the print request for the electronic document. The MFD may include additional electrical elements used in conjunction with general electronics and printing technology as well as specific electrical elements necessary for operation in specific types of wired and/or wireless communication networks. The print processor further may include one or more processors as well as other elements necessary to perform the various operations as described herein.

In some embodiments, the print processor may further create an electronic record associated with the electronic document based on a selection of one of the set of options for completing the print request by the user. The electronic record may include an identification of the printable page that cannot be printed. The electronic record may include an identification of the printable page that cannot be printed. The electronic record may additionally include an identification of the page size for the printable page that cannot be printed.

In some embodiments, the electronic record may be an electronic file that is stored in a memory location associated with a memory location used for storing the electronic document. In some embodiments, the electronic record may be included as metadata in the electronic document.

In some embodiments, the print processor may provide instructions to the print engine to print the printable page that cannot be printed using a size of print media included as one of the at least one size of print media used by the printing engine based on selection by the user of one of the printing options for the electronic document as part of completing the printing request.

In some embodiments, the print processor may further provide instructions to the print engine to print at least one other printable page from the set of printable pages using the at least one size of print media as part of completing the print request when it is determined that a page size of the at least one other printable page matches the at least one size of print media.

In some embodiments, the at least one size of print media used or available in the multi-function apparatus may be provided to the print engine from at least one media storage tray.

In some embodiments described herein, a method or process is described that utilizes a mechanism for managing the printing of electronic documents having multiple page sizes. The method or process includes receiving a request to print an electronic document, arranged as a set of printable pages, on a printing device based on a job created by a user. The method or process further includes determining if a page size for a printable page of the set of printable pages in the electronic document matches at least one print media size available for printing on the printing device. The method of process further includes providing a message for display to the user, the message including an indication that the page size for the printable page is not available on the printing device when it is determined that the page size of the printable page does not match the at least one print media size available for printing on the printing device. The message also includes a menu with a set of user selectable options for completing the print request on the printing device.

In some embodiments described herein, an apparatus may be included to perform one or more of the aspects of the disclosure described by the various embodiments herein. The apparatus includes a memory for storing a printable document, the printable document arranged as a set of pages. The apparatus further includes a processor configured to receive a request from a user to print the printable document and determine if a page size for a page in the set of pages matches at least one size of print media available for printing using a printing device. The processor is additionally configured to provide a notification to the user that the printable page cannot be printed on the printing device when the page size for the page does not match the at least one size of print media size available for printing using the printing device. The notification also provides a set of options to continue to print at least a portion of the printable document using the printing device. The apparatus may include additional electrical elements used in conjunction with general electronics and printing technology as well as specific electrical elements necessary for operation in specific types of wired and/or wireless communication networks. The processor may further be embodied as one or more processors and may include other elements necessary to perform the various operations as described above. The memory may include additional elements, including but not limited to, a data storage element, and a memory for storing program instructions. The memory or similar elements may provide the program instructions to the processor in order to execute the various mechanisms in the embodiments described herein.

The implementation of one or more of the aspects of the processes, mechanisms, systems, and devices of the present embodiment provides an alert to the user the required print media or paper sizes for an electronic document are not available on the current printing device prior to printing as part of a print job or copy job. The user may select from options as to how to proceed, including choosing to print using different sizes of paper together or may choose to print part of the electronic document at a different printing device with the capability to automatically print the remaining unprinted pages. The present disclosure minimizes the manual effort to separate the pages of the electronic document based on page sizes and create separate print jobs as well as reduce the waste of materials from printing multiple versions of the electronic document.

These and additional operations are further described with respect to the embodiments depicted in FIGS. 1-8 below.

FIG. 1 illustrates an exemplary system 100 for releasing a secure print job between users. System 100 includes a plurality of user devices 110a-110c coupled to a plurality of MFDs 130a-130d and a network storage 140 through a network 120. User devices 110a-110c, MFDs 130a-130d, and network storage 140 may be located throughout sites within the same building or dwelling and connected through one or both of a wired and wireless local area network using a communication protocol including, but not limited to, Institute of Electrical and Electronics Engineers (IEEE) standard 802.3, Wi-Fi, and IEEE standard 802.11. One or more of user devices 110a-110c and/or network storage 140 may additionally be located in a different or remote facility from the dwelling or building where the one or more of the MFDs 130a-130d are located. The one or more remotely located user devices 110a-110c and/or network storage 140 may be communicatively coupled to the one or more MFDs 130a-130d through a private or public network using a communication protocol including, but not limited to, Internet Protocol or any cellular communication protocols.

In operation, system 100 performs various aspects of a mechanism for sharing a job between users. The mechanism may be performed entirely in one or more of MFDs 130-130d. In some instances, some portions of the mechanism may be performed in one or more of user devices 110a-110c or in network storage 140. The mechanism includes receiving a request to print an electronic document, as part of a copy or print job, on one of the MFDs 130a-130d. The electronic document includes printable data and is generally arranged as a set pages that are printable on the one of the MFDs 130a-130d. The electronic document may be created as part of initiating a print job or alternatively may be loaded transferred or uploaded to the one of the MFDs 130a-130d through network storage 140 through network 120 or using a directly attached portable storage device. The mechanism further includes determining if a page size for a printable page of the electronic document matches at least one print media size available for printing on the one of the MFDs 130a-130d. The mechanism additionally includes providing a message for display to the user, either on the one of the MFDs 130a-130d or on one of the user devices 110a-110c when it is determined that the printable page does not match the at least one print media size available for printing on the printing device. The message includes a notification to the user that the printable page cannot be printed on the printing device. The displayed message also includes menu screen for prompting an input from the user to continue printing electronic document based on a set of options for completing print request for the electronic document on the one of the MFDs 130a-130d.

The user devices 110a-110c may be any one of a personal computer, a laptop computer, a computer network terminal, a tablet, a cellular phone, a smartphone, and the like. User devices 110a-110c may include processors, displays, communication interfaces, user interfaces, and memories, along with various program modules stored in a memory and executed by a processor, to implement specific functions, such as print servers, print drivers, graphic user interface menus, and communication protocols. Further elements and operations related to devices similar to user devices 110a-110c will be described in further detail below.

MFDs 130a-130d may be any one of a printer, a printer/fax machine, a printer/scanner machine, and the like. MFDs 130a-130d may include one or more processors, a printer mechanism, mechanical printing media processors, a network interface, a user interface, and storage elements, along with various program modules stored in the storage elements and executed by the one or more processors. Further elements and operations related to devices similar to MFDs 130a-130d will be described in further detail below.

Network storage 140 may include one or more storage elements including, but not limited to, single hard drives, parallel connected or redundant array of independent disks (RAID) drives, optical drives, and solid-state drives using static or dynamic storage mechanisms. Network storage 140 may be located in one location as part of one device or may be distributed across a number of devices and/or distributed across a number of locations. In some embodiments, all or a portion of network storage 140 may operate on a network external to network 120 or in the cloud and be interfaced to user devices 110a-110c and/or MFDs 130a-130d as described above.

Figure 2:
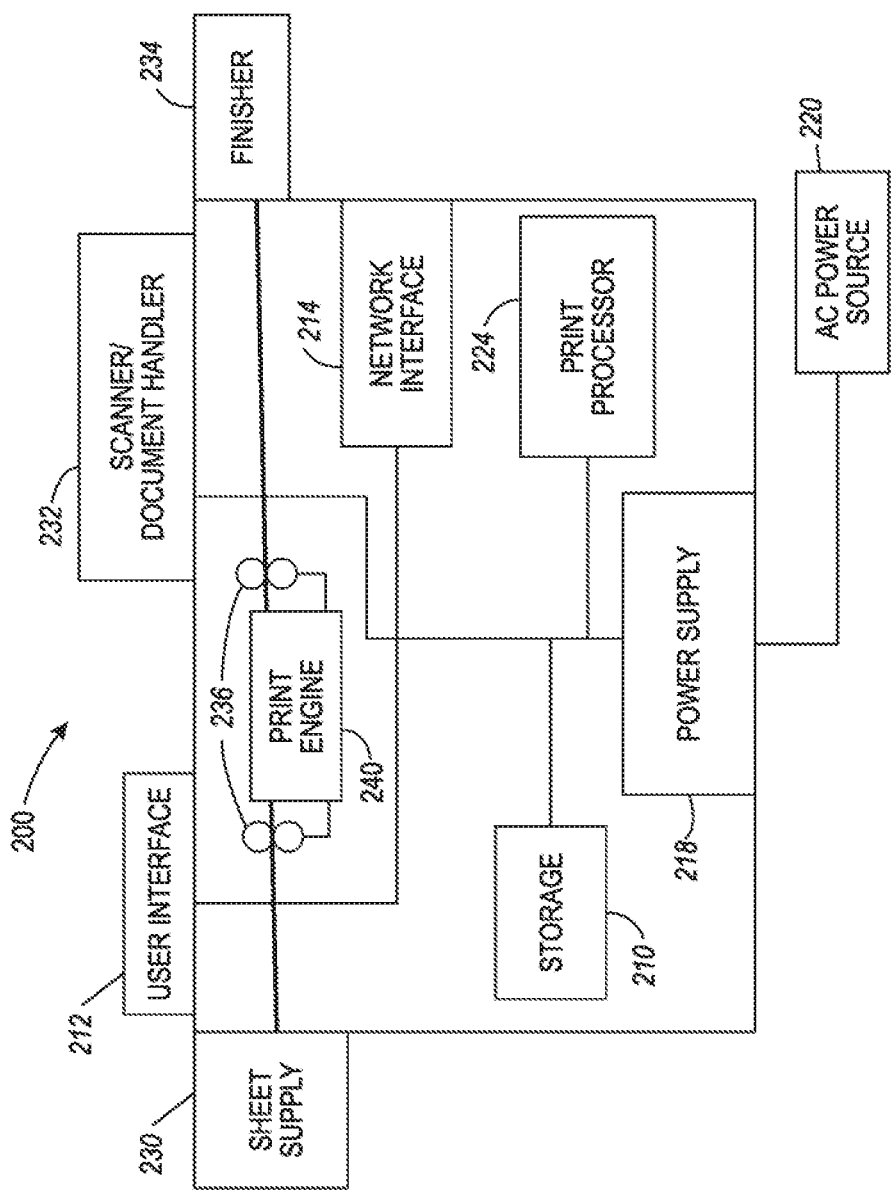
FIG. 2 depicts an exemplary multi-function device including aspects for managing the printing of an electronic document having multiple page sizes.

FIG. 2 illustrates an exemplary MFD 200, which can be used for releasing a secure print job between users. MFD 200 may operate in a manner similar to MFDs 130a-130d described in FIG. 1. MFD 200 may also be embodied as, or incorporated in, a printer, copier, multi-function machine, or other device that includes the capability to print, scan, and/or copy a document, including an electronic document, on a physical printable and/or readable media, such as paper. MFD 200 includes a marking device or printing engine 240 capable of printing markings on sheets of print media, a print processor 224 operatively coupled to the printing engine 240, a user interface 212 operatively coupled to the print processor 224, and a network interface 214 operatively coupled to the print processor 224 and printing engine 240. A storage element 210 is also operatively coupled to network interface 214, print processor 224, and printing engine 240. Printing engine 240 is also operatively coupled to sheet supply 230, scanner/document handler 232, media path 236, and finisher 234. Power supply 218 receives input from power source 220 and provides power to components in MFD 200 including storage element 210, network interface 214, print processor 224, and printing engine 240. Other elements may be included in MFD 200 but are not described here in the interest of conciseness.

In operation, print processor 224 receives a request to print an electronic document using print engine 240. The request to print is based on a job created by a user, as part of a print job or copy job request at MFD 200 or as part of a print job at a user device (e.g., user devices 110a-110c). The electronic document includes data arranged as a set of printable pages. Print processor 224 further determines if a page size for a printable page of the set of printable pages in the electronic document matches the at least one size of print media. Print processor 224 additionally provides instructions to user interface 212 for displaying a message, created by print processor 224, to the user when it is determined that the printable page does not match the at least one print media size. The message includes a notification to the user that the printable page cannot be printed. The message also includes a message prompting an input from the user based on a set of options for completing the print request for the electronic document.

Print processor 224 may also be referred to as an image processor and operates in a different manner than a general purpose processor because it is specialized for processing image data. A printing mechanism is initiated by instructions in signals communicated from print processor 224 to printing engine 240. Media path 236 is positioned to supply continuous media or sheets of print media (e.g., paper, cardstock, or velum) from sheet supply 230 to the marking device(s) included in printing engine 240. After printing engine generates and applies various markings to sheets of print media, the sheets may optionally pass to finisher 234 which can flip, fold, staple, sort, collate etc., the various printed sheets based on the additional information associated with printing the electronic document.

Printing engine 240 may include any marking device that applies a marking material (e.g., toner, inks, etc.) to continuous print media or sheets of print media, whether currently known or developed in the future and can include, for example, devices that use a photoreceptor belt or an intermediate transfer belt or devices that print directly to print media (e.g., inkjet printers, ribbon-based contact printers, etc.). Scanner/document handler 232 may be used for feeding or re-feeding (e.g., in duplex print mode) printed media sheets, either automatically or manually with inputs from a user, in any of the printing, scanning or faxing modes available. Sheet supply 230 may include one or more trays for storing and positioning sheets or other forms print media, such as paper, for entry onto media path 236. Each of the one or more trays may be configured to include, or be loaded with, one or more specific and/or different sizes of print media or paper. The sizes of print media or paper may include various conventional paper sizes, such as A3, A4, A5 letter, legal, etc. Other paper or media sizes, including non-conventional sizes may be also be included. Sheet supply 230 may include a bypass tray that allows external print media, such as previously printed pages to be added and entered into media path 236 for marking instead of, or in addition to, any printable media already in sheet supply 230.

Sheet supply 230 may include a detection mechanism, not shown, for identifying the print media size and communicate information for the available print media sizes in sheet supply 230 to either print engine 240 or print processor 224. Alternatively, or additionally, print processor 224 may provide a menu to display on user interface 212 for user selection of the print media size for each of the trays in sheet supply 2300. The menu may also include instructions to load the appropriate size of print media sheets into the appropriate trays in sheet supply 230. Print processor 224 uses the information about print media or paper availability received from sheet supply 230, print engine 240, and/or user interface 212 as part of determining if the page size for a printable page of the set of printable pages in the electronic document matches at least one print media size available for printing.

As part of the printing function in MFD 200, user interface 212 displays one or more menus that may include various print options for the print jobs to be printed. User interface 212 may receive instructions for displaying the menus from print processor 224 and may further provide entry information to print processor 224. The menus may include an option, selectable by the user, to create an electronic record associated with the electronic document as part of completing the printing request. The electronic record is created by print processor 224. The electronic record may include an identification of the printable page that cannot be printed. The electronic record may additionally include a printed page size for the printable page that cannot be printed. It is important to note that the electronic record created by print processor 224 may be a separate electronic file that is stored in a memory location associated with a memory location used for storing the electronic document. The electronic record may alternatively be inserted or appended as metadata directly in the printable electronic document by print processor 224.

It is important that the electronic record may be used to continue printing one or more pages for the electronic document for which it was determined that the page size of the page of the electronic document did not match a size of available print media in sheet supply 230. The printing may be continued when the size of print media that matches the page size for the page of the electronic document is available in sheet supply 230. The printing may also be continued on a different printing device or MFD by transferring or uploading the electronic document along with the associated electronic record.

The menus displayed on user interface 212 may also include a menu with a user selectable entry for print processor 224 to provide instructions to print engine 240 to print the printable page that cannot be printed using a size of print media or paper included as one of the at least one size of print media used by the printing engine. Print processor 224 may include image scaling capability to re-scale the information on the printable page to fit on the size of print media or paper that is included in sheet supply 230 and provide the re-scaled printable page to print engine 240 for printing.

The menu may further include a user selectable entry for print processor 224 to provide instructions to print engine 240 to print at least one other printable page from the set of printable pages using the at least one size of print media when it is determined that the at least one other printable page matches the at least one size of print media. Details regarding menu entries associated with managing the printing of an electronic document with different page sizes will be described in further detail below.

In some embodiments, MFD 200 may also include an external memory interface (not shown) for inserting a portable memory device. The portable memory device may include, but is not limited to, a USB memory drive, a portable hard drive, an optical drive, a flash memory card, and the like. The portable memory device may include a source document for conversion to a printable electronic document by print processor 224 or may include a print-ready electronic document that may be directly transferred to print engine 240.

Figure 3:
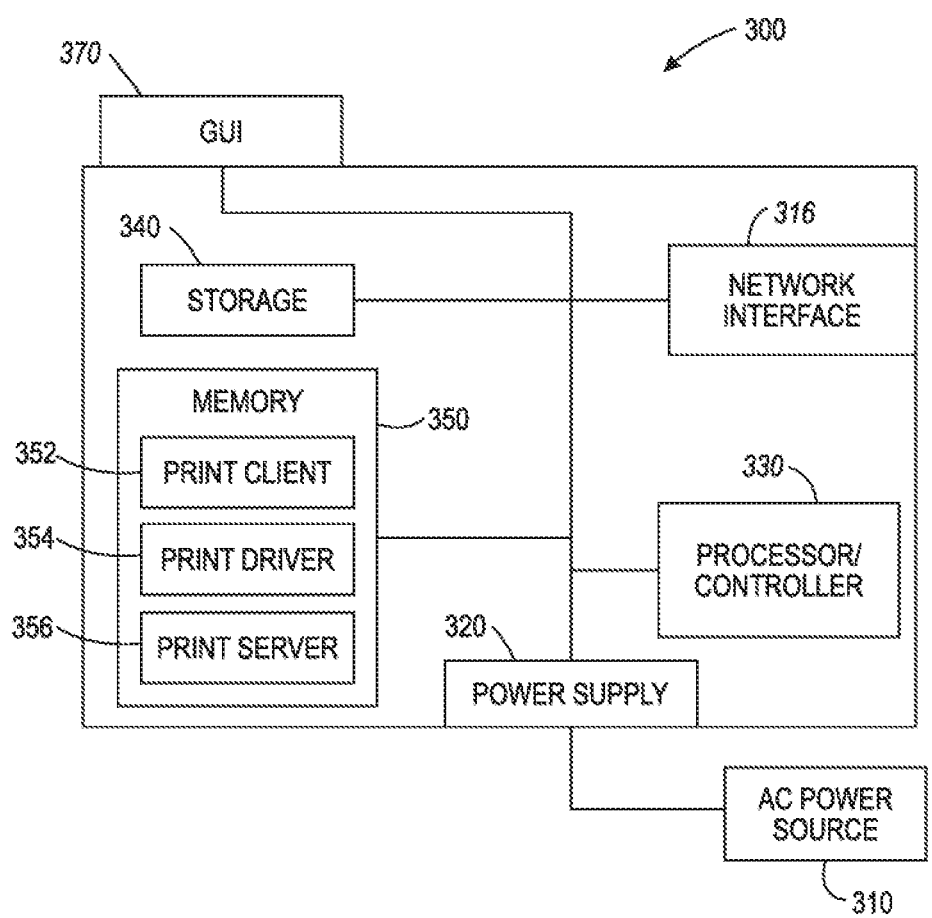
FIG. 3 depicts an exemplary user device includes aspects for managing the printing of an electronic document having multiple page sizes.

FIG. 3 illustrates an exemplary user device 300 which can be used with systems and processes for printing and reusing customized sample sets while printing documents User device 300 may operate in a manner similar to user devices 110a-110c described in FIG. 1. Further, some or all of the elements of user device 300 may be included as part of a printer or MFD, such as MFD 200 in FIG. 2 or MFDs 130a-130d in FIG. 1. User device 300 may also be embodied as, or incorporated as part of, a print server, a personal computer, a tablet, a smartphone, a portable computing device, etc. User device 300 includes a processor/controller 330 operatively coupled to a network interface 360, storage element 340, and memory 350. Processor/controller 330 is also operatively coupled to graphical user interface (GUI) 370. Power supply 320 receives input from power source 310 and provides power to components in user device 300 including storage element 340, memory 350, network interface 360, and processor/controller 330. Other elements may be included in user device 300 but are not described here in the interest of conciseness.

Network interface 360 is used for communications to and from user device 300 and includes one or both of a wired or wireless connection and circuitry to support one or more communication protocols including, but not limited to, IEEE802.11, Ethernet, and cellular networks. Processor/controller 330 controls the various actions, computations, functions, and processes, including various aspects of the embodiments described herein, by receiving inputs and providing instructions to the various elements within user device 300 or within a device incorporating user device 300. Processor/controller 330 may also receive inputs and provide instructions to other devices, such as MFD 200, in order to control aspects of the other devices, including the various aspects of the embodiments described herein, through network interface 360.

A storage element 340 provides storage for information and data (e.g., electronic documents prior to selection for printing) created or used by user device 300. Storage element 340 may include large storage capacity elements, such as optical, magnetic, capacitor based elements that are writable and readable by processor/controller 330. GUI 370 provides one or more interface elements to interact with a user. GUI 370 may include one or more of a keyboard, mouse, voice detector or microphone, and touch pad in which to enter instructions from a user. GUI 370 may additionally include a speaker or display in which to convey messages, instructions, and menu options to the user.

Memory 350 includes storage for various software program modules used in conjunction with managing electronic documents for printing as part of a printing device, such as MFD 200 in FIG. 2 or MFDs 130a-130d in FIG. 1. Memory 350 includes a module for a print client 352, which can be a mobile client, desktop client, email client, etc. Print client 352 submits print jobs through a print server, such as print server module 356. Memory 350 also includes a print driver 354 that converts a source document, such as an electronic document produced using a word processing program on user device 300, to a print-ready electronic document. The source document may be, for example, a .pdf file, .doc file, .jpeg picture, .txt file, etc., that a user wishes to print, while the print-ready document is a rasterized document (e.g., bitmap document) or printer specific document that a printer (e.g., MFD 200) can print without further processing. Print server module 356 accepts the print job from the print client 352, and the electronic document is queued as a print job until the user requests the print job be printed at a specific printer (e.g., MFD 200).

In some embodiments, user device 300 may also include an external memory interface (not shown) for inserting a portable memory device. The portable memory device may include a source document for conversion using print driver 354, as described above, or may include a print-ready document that may be directly included in the queue as part of print server module 356.

It is important to note that each printing device or MFD may have different capabilities or availabilities for print media. As such, the print server module 356 may receive information over the network (e.g., network 120 described in FIG. 1) associated with the current status for each printer or MFD (e.g., MFDs 130a-130d). The information may include the status of the different sizes of the sheets of print media or paper in the sheet supply trays (e.g., sheet supply 230 in FIG. 2). The information may be stored in memory 350 in conjunction with print server module 356 and further used by processor/controller 330 for managing the printing of an electronic document that has multiple page sizes. Processor/controller 330, using the print client 352, print driver 354, and print server module 356, may determine if one or more of the page sizes required for printing the electronic document matches at least one print media size available for printing on a printing device (e.g., MFD 200) selected by the user when one or more of the pages does not match the at least one print media size available on the selected printing device, as described above.

Print client 352 may also include code to display additional messages and menus in GUI 370 associated with printing an electronic document. Print client 352 may include code for providing a message indicating that one or more of the pages from the electronic document cannot be printing based on the determination made above by processor/controller. In some embodiments, print client 352 may also include code for providing a display a menu with a set of options, selectable by the user, on GUI 370. The menu may include an option to create an electronic record associated with the electronic document as part of completing the printing request, as described above. The menu may further include an option to provide instructions to print the printable page that cannot be printed using a size of print media or paper that is included and/or available on the printing device as part of completing the printing request. Processor/controller 330 may include image scaling capability to re-scale the information on the printable page to fit on the size of print media or paper that is included and/or available on the printing device.

Figure 4:
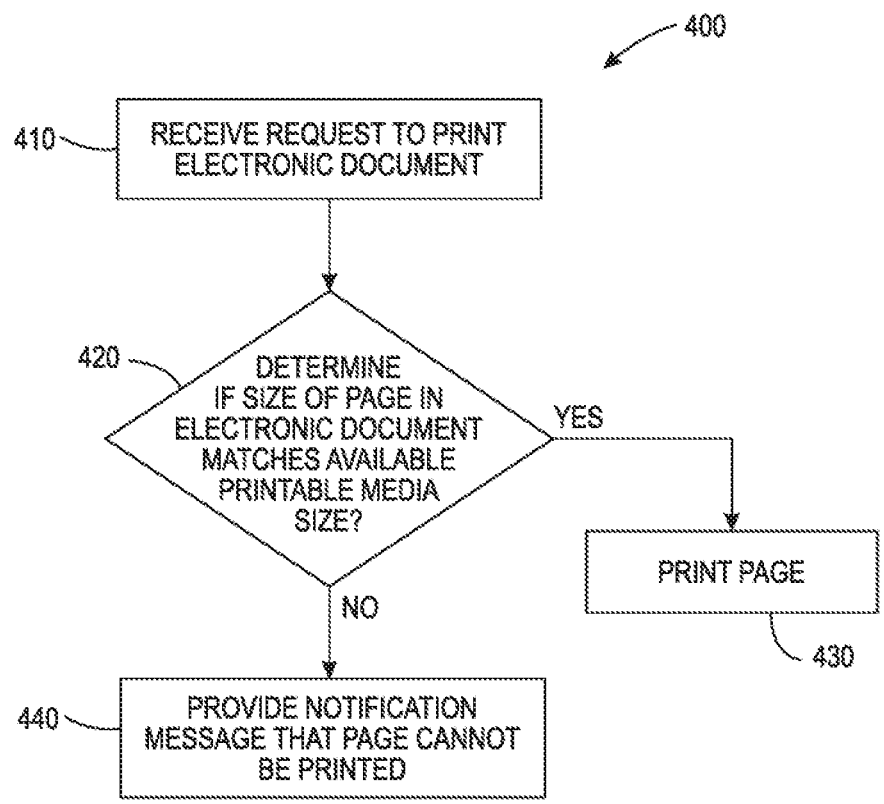
FIG. 4 depicts an exemplary process including aspects for managing the printing of an electronic document having multiple page sizes.
Figure 5:
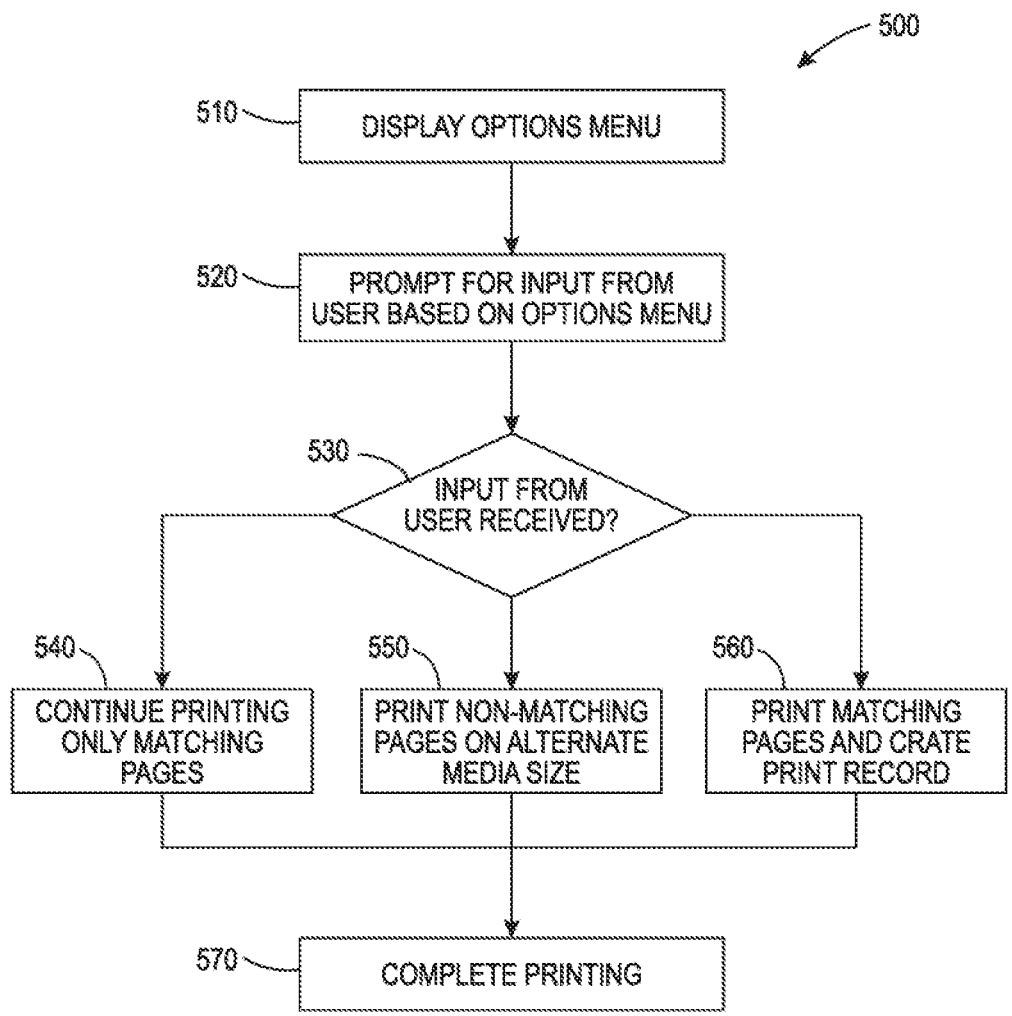
FIG. 5 depicts another exemplary process including aspects for managing the printing of an electronic document having multiple page sizes.

FIGS. 4 and 5 illustrate exemplary processes for managing the printing of an electronic document that includes multiple page sizes. The processes are primarily described with respect to a printing device, such as MFD 200 described in FIG. 2. The processes may also be performed by a printer in combination with other functions, such MFDs 130a-130d described in FIG. 1. Further, the processes may be performed in a combination of devices, such as user device 300 described in FIG. 3 as well as user devices 110a-110c and MFDs 130a-130d described in FIG. 1. Although each of the processes depicts steps performed in a particular order for purposes of illustration and discussion, the operations discussed herein are not limited to any particular order or arrangement. One skilled in the art, using the disclosures provided herein, will also appreciate that one or more of the steps of the processes may be omitted, rearranged, combined, and/or adapted in various ways.

FIG. 4 illustrates an exemplary process 400 associated with determining whether a printing device or MFD is capable of printing all the different page sizes of an electronic document requested by a user. At step 410, a request is received to print an electronic document on a printing device, such as MFD 200. The request to print may be based on a job or task created or initiated by a user and performed using MFD 200. The job or task may be one of a print job or copy job. The request may be received as a result of a user entry through user interface, such as user interface 212. The request may alternatively be received as a communication signal received at network interface 214 from another device on a network, such as one of user devices 110a-110c through network 120. The request may further be initiated by inserting a portable memory device containing the electronic document into MFD 200. The electronic document includes information or data represented as text and/or graphic images that is arranged as a set of printable pages. Print processor 224 retrieves the electronic document from a memory location or printer queue (e.g., storage element 210, network storage 140, or inserted portable memory device) and identifies the information, such as metadata, associated with the set of printable pages. The information includes a page size for each page of the set of printable pages.

At step 420, a determination is made as to whether a page size for a printable page of the set of printable pages in the electronic document matches at least one print media size available for printing on MFD 200. As part of the determination, at step 420, print processor 224 may query and/or receive information from sheet supply 230, user interface 212, and/or print engine 240 identifying the page sizes and status for the sheet media in each of the print media trays in sheet supply 230. Print processor 224 may then compare the page size for the printable page with the available identified page sizes in sheet supply 230. Print processor 224 may also provide an indication as to whether additional page sizes are identified as used in sheet supply but are not currently available and require reloading or re-stocking in the appropriate print media tray.

If, at step 420, the determination is made that the page size for the printable page matches one of the available identified page sizes in sheet supply 230, then at step 430, the printable page may be printed or may be tagged for printing in MFD 200. If, at step 420, the determination is made that the page size for the printable page does match one of the available identified page sizes in sheet supply 230, then at step 440, print processor generates a notification message indicating that the printable page cannot be printed on MFD 200. The notification message may be provided to user interface 212 for display to the user. The notification message may alternatively or additionally be provided to the network interface 214 and communicated through a network (e.g., network 120) for display on a user device (e.g., user device 300). The notification message may further include a message for display including an options menu and prompting the user input to continue printing or processing the electronic document based on a selection of one of the options as part of completing print or copy job. The display of the options menu will be described in further detail below.

Process 400 may operate iteratively to process the remaining printable pages in the set of printable pages of the electronic document. The remaining printable pages may be processed by returning to step 420 and determining whether a page size for each of the remaining printable pages of the set of printable pages in the electronic document matches at least one print media size available for printing on MFD 200 until all printable pages have been processed.

It is important to note that not all the steps of process 400 may be required, or one or more steps may be modified. For example, the page printing, at 430, may be omitted or may be modified to allow for accounting of all printable pages that cannot be printed based on the determination, at step 420. The page printing aspect may be included as an option in the options menu, at step 440. Similarly, the notification message, at step 440, may not be provided until a determination is made, at step 420, for all printable pages in the electronic document.

FIG. 5 depicts an exemplary process 500 associated with providing a set of options to a user for completing the print job or copy job. Process 500 may be implemented following the determination that one or more of printable pages in an electronic document cannot be printed on a printing device or MFD, such as is described in process 400. At step 510, an options menu is displayed on a user interface on a printing device or MFD, such as user interface 212 on MFD 200. The options menu may be similar to the options menu created and provided as part of step 440 described in FIG. 4. The options menu is displayed in order to provide a set of selectable options for a user to complete the job or task of printing an electronic document that has one or more printable pages that cannot be printed on MFD 200.

At step 520, the user is prompted for an input based on selectable options or entries displayed in the options menu, at step 510. At step 530, a determination is made as to whether an input is received from the user based on the prompt for the input, at step 520. When it is determined that an input from the user is received, at step 530, process 500 continues based on one of three possible selection entries made as the input. The three possible selections are continue printing only matching pages, at step 540, print non-matching pages on alternative media size, at step 550, and print matching pages and create print record, at step 560. The input, when received, is only one of the three of these selection entries, based on the options displayed in the options menu, at step 510.

As a result of an input received, at step 530, the selection entry from the user to continue printing only matching pages at step 540, print processor 224 provides instructions to print engine 240 to print one or more of the printable pages from the electronic document using the proper print media or paper sizes in sheet supply 230. The instructions may include identification of the printable pages (e.g., by page number) as well as the proper print media or paper size that matches the printable page size. The printable pages of the electronic document for which no matching print media or paper size was identified and/or available in sheet supply 230 are not included as part of the instructions.

As a result of an input received, at step 530, the selection entry from the user to print non-matching pages on an alternate media size at step 550, print processor 224 provides instructions to print engine 240 to print one or more of the printable pages from the electronic document using the proper media or paper sizes in sheet supply 230. Print processor 224 further provides instructions to print engine 240 to print the remaining printable pages that cannot be printed using a size of print media or paper identified and/or available in sheet supply 230 using a size or print media or paper that is available. Additionally, print processor 224 may provide an additional message for display on user interface 212 that includes a prompt or request for selection of a print media or paper size for the remaining printable pages that cannot be printed. An option may also be provided in the menu to allow print processor 224 to automatically select the print media or paper size.

As a result of an input received, at step 530, the selection entry from the user to print matching pages and create print record, at step 560, print processor 224 provides instructions to print engine 240 to print one or more of the printable pages from the electronic document using the proper media or paper sizes in sheet supply 230. Print processor 224 further creates an electronic record associated with the electronic document based on determining the one or more remaining printable pages that cannot be printed using a size of print media or paper that is available. The electronic record may include an identification as well as a printed page size for the printable page that cannot be printed. The electronic record may be an electronic file and may be identified using a filename with the same prefix as the electronic document but with a different suffix, such as .config. The electronic record may instead be included as metadata in the electronic document. The electronic record or electronic file, along with the electronic document, may be stored in a memory location in MFD 200, another device, or in a remote printer queue or storage (e.g., network storage 140). The electronic document may further be stored, with the electronic record or file, on a portable storage or memory device to allow the user to continue the printing on a different printing device or MFD.

At step 570, after identifying the selection made by the user for continuing the printing process, at step 540, 550, or 560, the instructions provided to print engine 240 are executed to complete the printing. It is important to note that in some embodiments, the determination, at step 530 may also include a selection entry for some form of cancellation mechanism (not shown). The cancellation mechanism may include a selectable entry as part of the options menu displayed on a user interface that exits the options menu and returns to another menu on the device (e.g., MFD 200 or user device 300). The cancellation mechanism may also include time-out feature providing a time period for a user input. If no input is received, the user interface effectively executes a cancel entry as described above. As a result of the cancellation mechanism, process 500 is ended without completion of printing, at step 570, and no printing is performed.

Figure 6:
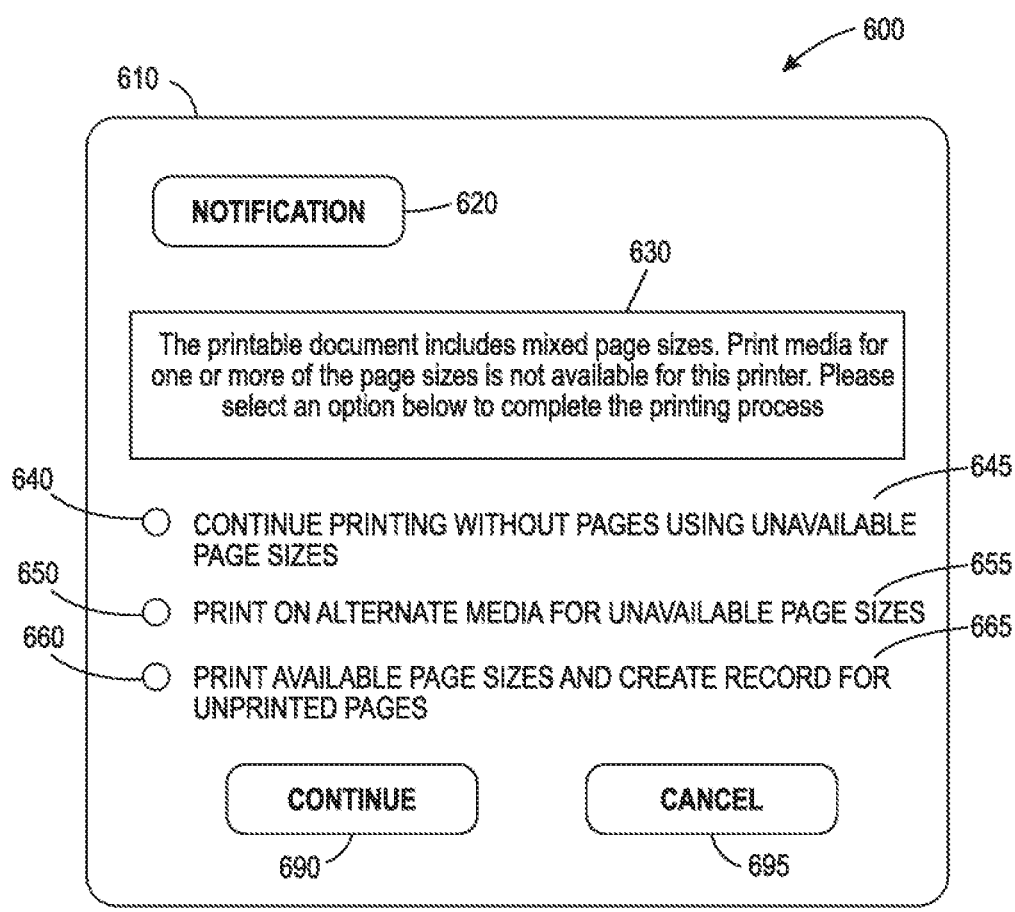
FIG. 6 depicts an exemplary screenshot from a display on a device used as part of managing the printing of an electronic document having multiple page sizes.

FIG. 6 depicts a screenshot from a display in a user interface for an options menu screen 600 used for managing the printing of an electronic document having a plurality of page sizes. The display may be included in one or more user interfaces, such as user interface 212 described in FIG. 2 or GUI 370 described in FIG. 3. Options menu screen 600 is described in relation to one or more of the steps of process 500 described in FIG. 5. It is important to note that options menu screen 600 may also be used in conjunction with process 400 in FIG. 4 as well as other processes similar to, and/or containing aspects of process 500 or process 400 in conjunction with managing the printing of electronic documents.

Options menu screen 600 includes a message window 610. Message window 610 includes an identifier block 620. Identifier block 620 indicates that the message is a "NOTIFICATION", although other message identifiers may be displayed in identifier block 620. Message window 610 further includes a message box 630 containing a message. The content of the message displayed in message box 630 may vary depending on the type of message identifier as well as the specific message provided. Message box 630 displays a message related to the determination of matching pages. Prompt user for further action. The message displayed in message box 630 shows the message "The printable document includes mixed page sizes. Print media for one or more of the page sizes is not available for this printer. Please select an option below to complete the printing process".

Message window 610 also includes three radial selection buttons 640, 650, and 660 along with text identifiers 645, 655, and 665 respectively as part of the selection prompt in message box 630. Selection button 640 is identified with text identifier 645 as "CONTINUE PRINTING WITHOUT PAGES USING UNAVAILABLE PAGE SIZES" and corresponds to the selection described in step 540 described in FIG. 5. Selection button 650 is identified with text identifier 655 as "PRINT ON ALTERNATE MEDIA FOR UNAVAILABLE PAGE SIZES" and corresponds to the selection described in step 550 described in FIG. 5. Selection button 660 is identified with text identifier 665 as "PRINT AVAILABLE PAGE SIZES AND CREATE RECORD FOR UNPRINTED PAGES" and corresponds to the selection described in step 560 described in FIG. 5. After the user selects one or more of the radial selection buttons 640, 650, 660 the user completes the entry and initiates further processing to complete the print job or task, as described above, by selecting the CONTINUE button 690. A CANCEL button 695 is also included to allow for exit from the options menu screen 600 without making a selection and/or for return to a previous menu screen on the display.

Figure 7:
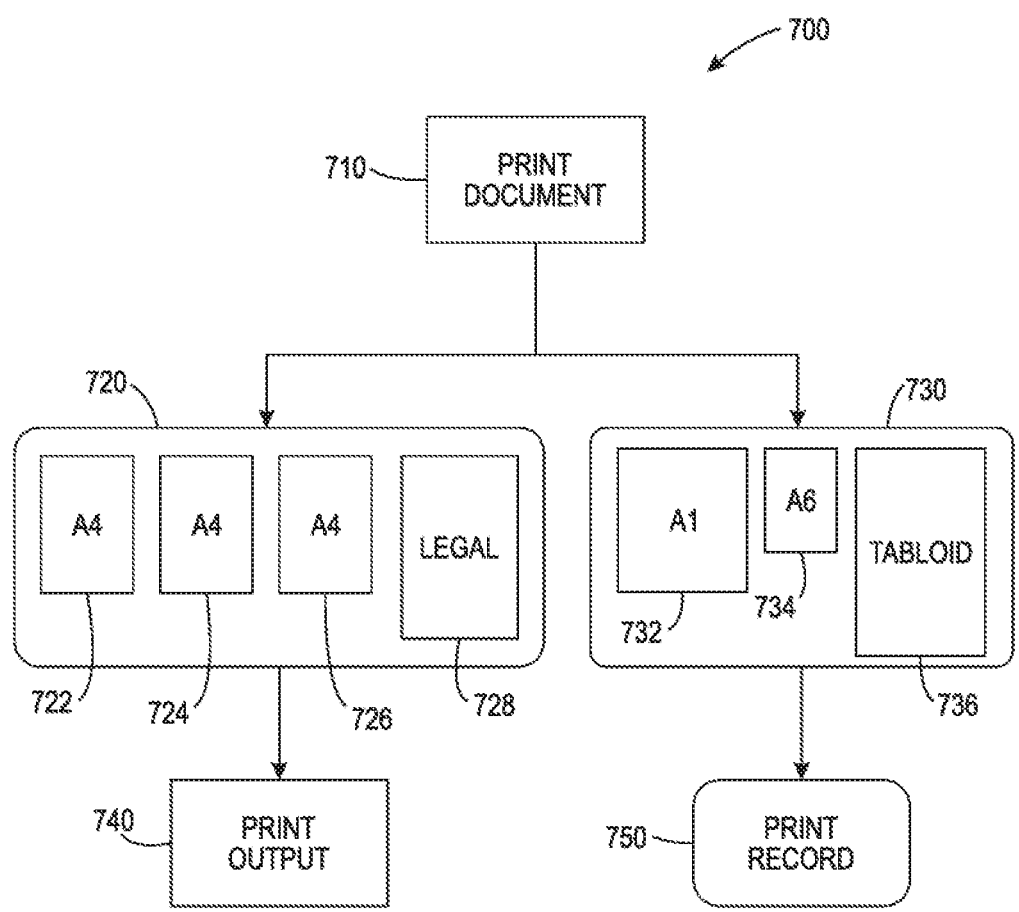
FIG. 7 depicts an exemplary page management structure used as part of managing the printing of an electronic document having multiple page sizes.

FIG. 7 depicts an exemplary page management structure 700 used as part of managing the printing of an electronic document having multiple page sizes. Page management structure 700 may be created in conjunction with determining which printable pages of an electronic document cannot be printed because the correct print media or paper is not available on an MFD or printing device, as described above. Page management structure 700 may further be created by a processor in a printing device or MFD (e.g., printer processor 224 in MFD 200) or may be created by a processor in a user device (e.g., processor/controller 330 in user device 300) and further stored in memory (e.g., storage element 210 or storage element 340). Page management structure 700 may be used in conjunction with printing all or a portion of an electronic document as part of a print job or copy job request initiated by a user. Page management structure 700 may also be used to create an electronic record of printable pages that cannot be printed when it is determined that a page size for each of those printable pages did not match one of the sizes of the print media or paper available on the MFD or printer device.

Page management structure shows a print document 710. Print document represents an electronic document along with information and instructions for printing, include sizes for the printable pages. Print document 710 includes seven printable page entries, identified or represented as page entries 722, 724, 726, 728, 732, 734, and 736. Each page entry 722, 724, 726, 728, 732, 734, and 736 may include an identification to indicate print order, such as a page number as well as an indication of a page size (e.g., one of the standard sizes described above). The page entries for print document 710 are separated into two groups based on a determination as to whether the page size for the page entry matches the print media in a printer or MFD, as described above. A first group 720 includes the page entries 722, 724, 726, and 728 that match a print media or paper size. A second group includes the page entries 732, 734, and 736 that do not match a print media or paper size. It is important to note that one or both groups may include page entries for more than one page size. Entry information for group 720 may be included as part of printing instructions from a processor (e.g., print processor 224) to a print mechanism (e.g., print engine 240) in a printing device or MFD as part of a user selection to generate a print output 740, as described above. Entry information for group 730 may be used in creating a print record 750 to be included with the electronic document as part of completing the print task at a different printing device or MFD, as described above.

Figure 8:
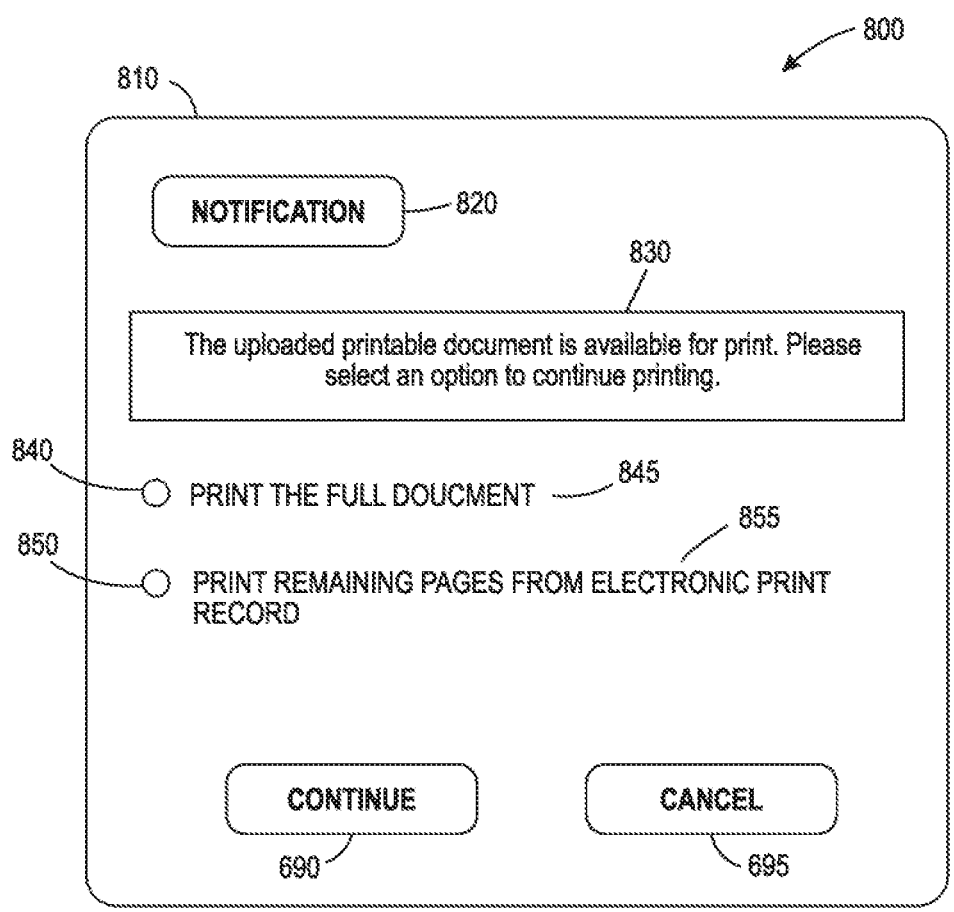
FIG. 8 depicts another exemplary screenshot from a display on a device used as part of releasing a secure print job between users.

FIG. 8 depicts another screenshot from a display in a user interface for a print mode screen 800 used for managing the printing of a document having a plurality of page sizes. The display may be included in one or more user interfaces, such as user interface 212 described in FIG. 2. Print mode screen 800 is primarily described in relation to the creation of an electronic print record associated with the printing of a remaining set pages of the document that could not be printed using a first printing device or MFD at a different printing device or MFD. Print mode screen 800 will display on the different printing device or MFD after a user initiates the retrieval or uploading of the printable document by either recalling the document from a printer queue or by inserting an external portable memory device into the different printing device or MFD.

Print mode screen 800 includes a message window 810. Message window 810 includes an identifier block 820. Identifier block 820 indicates that the message is a "NOTIFICATION", although other message identifiers may be displayed in identifier block 820. Message window 810 further includes a message box 830. The content of the message may vary depending on the type of message identifier as well as the specific message provided. Message box 830 shows the message "The uploaded printable document is available for print. Please select an option to continue printing."

Message window 810 also includes two radial selection buttons 840, 850 along with text identifiers 845 and 855 respectively as part of the selection prompt indicated in message box 830. Selection button 840 is identified with text identifier 845 as "PRINT THE FULL DOCUMENT" and provides instructions for the print mechanism, as described above, to print all pages of the uploaded printable document. Selection button 850 is identified with text identifier 855 as "PRINT REMAINING PAGES FROM CONFIG FILE." and provides instruction for the print mechanism, as described above, to print the pages of the uploaded printable document identified as not yet printed based on information in the electronic print record. After the user selects one or more of the radial selection buttons 840, the user completes the entry and initiates further processing to complete the print job or task by selecting the CONTINUE button 890. A CANCEL button 895 is also included to allow for exit from print mode screen 800 without making a selection and/or for return to a previous menu screen on the display.

It is important to note that the processes described in FIG. 4 and FIG. 5 may be applied as a result of the user executing printing of the uploaded printable document as a result of selection button 840 or selection button 850 in order to assure that the different printing device or MFD has the proper or required print media or paper sizes available for printing. Further, the electronic print record may be dynamically updated as the pages having different page sizes are printed. Additionally, when all the pages identified in the electronic print record are printed, on one or more printing devices or MFD, the electronic print record may be removed or deleted.

The terms printer, MFD, or printing device as used herein encompasses any apparatus, such as a digital copier, bookmaking machine, facsimile machine, multi-function machine, etc., which performs a print outputting function for any purpose. The details of printers, printing engines, etc. are well-known and are not described in detail herein to keep this disclosure focused on the salient features presented. The systems and methods herein can encompass systems and methods that print in color or monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that includes instructions for causing a computer or computing system to perform example process(es). The computer-readable storage medium is a computer-readable memory device. The computer-readable storage medium can, for example, be implemented via one or more of a volatile computer memory, a non-volatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for managing the printing of an electronic document having a plurality of page sizes (which are intended to be illustrative and not limiting), it is noted that modifications and variations can be made by persons skilled in the art in light of the above teachings. It is, therefore, to be understood that changes may be made in the particular embodiments of the disclosure which are within the scope of the disclosure as outlined by the appended claims.

What is claimed is:

1. A multi-function device, comprising:
a printing engine that prints data using at least one size of print media;
a print processor that receives a request to print an electronic document using the printing engine, the electronic document comprising data arranged as a set of printable pages, the request to print based on a job created by a user, the print processor further determining if a page size for a printable page of the set of printable pages in the electronic document matches the at least one size of print media; and
a user interface that receives instructions from the print processor to display a message to the user when it is determined that the page size of the printable page does not match the at least one size of print media and is an unavailable page size, the message comprising a notification that the printable page cannot be printed, the message also comprising a menu prompting an input from the user based on a set of options for completing the print request for the electronic document, the set of options including at least a first option to continue printing without the printable page having the unavailable page size and a second option to print on alternate media for the printable page having the unavailable page size.

2. The multi-function device of claim 1, wherein upon selection of the second option by the user, the print processor provides instructions to the printing engine to print the printable page that cannot be printed using a size of print media included as one of the at least one size of print media used by the printing engine.

3. The multi-function device of claim 1, wherein the print processor implements an image scaling capability to re-scale information on the printable page having the unavailable page size to print on an available print media size upon selection of the second option by the user.

4. The multi-function device of claim 1, wherein the at least one size of print media is provided to the printing engine from at least one media storage tray.

5. The multi-function device of claim 1, wherein the set of options includes a third option to print only available page sizes and create an electronic record for the printable page having the unavailable page size.

6. The multi-function device of claim 5, wherein the electronic record comprises an identification of the printable page that cannot be printed.

7. The multi-function device of claim 5, wherein the electronic record is an electronic file that is stored in a memory location associated with a memory location used for storing the electronic document.

8. The multi-function device of claim 5, wherein the electronic record is included as metadata in the electronic document.

9. The multi-function device of claim 5, wherein the electronic record further comprises an identification of the page size for the printable page that cannot be printed.

10. The multi-function device of claim 1, wherein the job request by the user is at least one of a print job request and a copy job request.

11. The multi-function device of claim 1, wherein the print processor receives the request as a communication signal from another device on a network.

12. A method, comprising:
receiving a request to print an electronic document on a printing device, the electronic document arranged as a set of printable pages, the request to print based on a job created by a user;
determining if a page size for a printable page of the set of printable pages in the electronic document matches at least one print media size available for printing on the printing device; and
providing a message for display to the user, the message comprising an indication that the page size for the printable page is not available on the printing device when it is determined that the page size of the printable page does not match the at least one print media size available for printing on the printing device and is an unavailable page size, the message also comprising a menu with a set of user selectable options for completing the print request on the printing device, the set of user selectable options including at least a first option to continue printing without the printable page having the unavailable page size and a second option to print on alternate media for the printable page having the unavailable page size.

13. The method of claim 12, wherein the second option for completing the print request comprises printing the printable page that has the page size that does not match the at least one print media size using a different page size that matches the at least one print media size available on the printing device.

14. The method of claim 12, further comprising implementing an image scaling capability to re-scale information on the printable page having the unavailable page size to print on an available print media size upon selection of the second option by the user.

15. The method of claim 12, further comprising providing a third option comprising creating an electronic record associated with the electronic document as part of completing the printing request.

16. The method of claim 15, wherein the electronic record comprises an identification of the printable page that has the unavailable page size.

17. The method of claim 15, wherein the electronic record further comprises an indication of the page size for the printable page.

18. An apparatus comprising:
a memory for storing a printable document, the printable document arranged as a set of pages; and
a processor configured to:
receive a request to print the printable document, the request associated with a job created by a user;
determine if a page size for a page in the set of pages matches at least one size of print media available for printing using a printing device; and
provide a notification to the user that the page in the set of pages cannot be printed on the printing device when the page size for the page does not match the at least one size of print media available and is an unavailable page size for printing using the printing device, the notification also indicating a set of options to continue to print at least a portion of the printable document using the printing device, the set of options including at least a first option to continue printing without the page having the unavailable page size and a second option to print on alternate media for the page having the unavailable page size.

19. The apparatus of claim 18, wherein the processor implements an image scaling capability to re-scale information on the page having the unavailable page size to print on an available print media size upon selection of the second option by the user.

20. The apparatus of claim 18, wherein the set of options includes a third option to print only available page sizes and create an electronic record for the page having the unavailable page size.

* * * * *